United States Patent
Tanaka (10) Patent No.: US 7,071,987 B1
(45) Date of Patent: Jul. 4, 2006

(54) DIGITAL CAMERA HAVING AUTOMATIC EXPOSURE CONTROL FOR DIFFERENT PHOTOGRAPHING MODES

(75) Inventor: Toshiyuki Tanaka, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/354,815

(22) Filed: Jul. 16, 1999

(30) Foreign Application Priority Data

Jul. 24, 1998 (JP) ................................. 10-209697

(51) Int. Cl.
*H04N 5/235* (2006.01)
*H04N 5/225* (2006.01)
*G03B 7/00* (2006.01)

(52) U.S. Cl. ................ 348/362; 348/220.1; 348/221.1; 396/213

(58) Field of Classification Search ................ 348/362, 348/364, 367, 220.1, 222.1, 227.1, 229.1, 348/221.1; 396/216, 213, 224, 238
See application file for complete search history.

(56) References Cited

U.S. PATENT DOCUMENTS

| | | | | |
|---|---|---|---|---|
| 4,746,949 A | * | 5/1988 | Takei et al. | 352/169 |
| 5,012,271 A | | 4/1991 | Nishimura et al. | 354/456 |
| 5,111,299 A | * | 5/1992 | Aoki et al. | 348/362 |
| 5,153,783 A | * | 10/1992 | Tamada et al. | 386/117 |
| 5,376,964 A | * | 12/1994 | Soga et al. | 348/362 |
| 5,382,974 A | * | 1/1995 | Soeda et al. | 348/221.1 |
| 5,424,772 A | * | 6/1995 | Aoki et al. | 348/221.1 |
| 5,459,511 A | * | 10/1995 | Uehara et al. | 348/363 |
| 5,517,243 A | * | 5/1996 | Kudo et al. | 348/296 |
| 6,327,423 B1 | * | 12/2001 | Ejima et al. | 386/96 |

FOREIGN PATENT DOCUMENTS

| | | |
|---|---|---|
| JP | 63-061566 A | 3/1988 |
| JP | 63-222585 A | 9/1988 |
| JP | 05167914 | 7/1993 |

* cited by examiner

*Primary Examiner*—David Ometz
*Assistant Examiner*—Nhan Tran
(74) *Attorney, Agent, or Firm*—Sidley Austin LLP (57) ABSTRACT

A digital camera includes an image pick-up element which receives light reflected from an object and generates image data of the object, and a light-receiving element which receives light reflected form the object and outputs light-quantity data for the object. The light-receiving element differs from the image pick-up element. In the sequence photograph mode, the exposure amount of the image pick-up element is controlled based on the light-quantity data output from the light-receiving element. In the other modes, the exposure amount of the image pick-up element is controlled based on the image data generated by the image pick-up element itself.

15 Claims, 6 Drawing Sheets

DIGITAL CAMERA HAVING AUTOMATIC EXPOSURE CONTROL FOR DIFFERENT PHOTOGRAPHING MODES

The present invention claims a priority based on the Japanese Patent Application No. H10-209697, the contents of which is incorporated hereinto by reference in its entirety.

BACKGROUND OF THE INVENTION

1. Field of the Invention

This invention relates to a digital camera and a method for controlling the exposure of the digital camera.

2. Description of the Related Art

As it is known, the photographing lens of a digital camera focuses an optical image onto a CCD (charge coupled device), which then photoelectrically converts the optical image into an electric signal. The generated electric signal is subjected to predetermined image processing, so that the photographed image is recorded as digital image data in a recording medium, such as a memory card. The recorded digital image is displayed on a display (e.g., an LCD panel).

A typical digital camera also has an exposure control system. A conventional exposure control system for a digital camera computes an appropriate exposure time based on the image data which was generated from the object image focussed onto the image pick-up device (e.g., the CCD).

In general, the diaphragm of a digital camera is of a fixed type. Accordingly, the exposure time, or the charge accumulation time of the CCD, which corresponds to the shutter speed of the digital camera is adjusted to obtain the optimum quantity of exposure.

However, with the conventional exposure control system for a digital camera, an exposure control value must be calculated for each photographing action by the arithmetic operation loop. If the object is photographed successively at a high speed to produce sequence photographs, the computation time (or the arithmetic operation time) for producing the appropriate exposure control value becomes longer than the photographing interval. If a priority is given to the high-speed successive photographing without adjusting the exposure value the quality of the resultant images is deteriorated due to inappropriate exposure because the photographing conditions cannot follow the change in the brightness of the object.

Another technique for controlling the exposure time is to provide a light-receiving device, such as a photoconductive cell and a photodiode, for exclusive use in exposure control. The exposure time is controlled in accordance with the brightness information of the object obtained from the light-receiving device. However, because the exclusive light-receiving device is required other than the CCD, the number of components increases, the size of the camera becomes larger and the cost of manufacturing the digital camera also increases.

SUMMARY OF THE INVENTION

Therefore, it is an object of the invention to provide a digital camera which can follow a change in the brightness of the object even in the high-speed sequence-photograph mode so that a high-quality image with an appropriate exposure can be obtained.

It is another object of the present invention to provide a digital camera which does not require a light-receiving element exclusively used for exposure control, and can reduce the size and the manufacturing cost.

It is still another object of the present invention to provide a method for controlling the exposure amount of a digital camera.

According to one aspect of the present invention, a digital camera which has a sequence-photograph mode and other modes comprises an image pick-up element for receiving light reflected from an object and outputting image data of the object; a light-receiving element for outputting data as to a light quantity received from the object; a first controller for controlling an exposure amount of the image pick-up element based on the light-quantity data output from the light-receiving element in the sequence-photograph mode; and a second controller for controlling the exposure amount of the image pick-up element based on the image data output from the image pick-up element in the other modes. The light-receiving element is different from the image pick-up element.

With this digital camera, during the execution of the normal modes other than the sequence-photograph mode, the exposure amount of the image pick-up element is controlled based on the output from the image pick-up element itself.

On the other hand, in the execution of the sequence photograph mode, the exposure amount of the image pick-up element is controlled based on the output of the light-receiving element. Accordingly, during a high-speed successive photographing operation, any changes in the brightness of the object can be promptly reflected in the exposure amount for the next shot (or frame). Unlike the conventional digital camera which calculated the exposure amount from the image data output from the CCD array for each photographing action, the digital camera of the present invention can provide the optimal exposure amount for each shot even in the high-speed sequence photograph mode.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
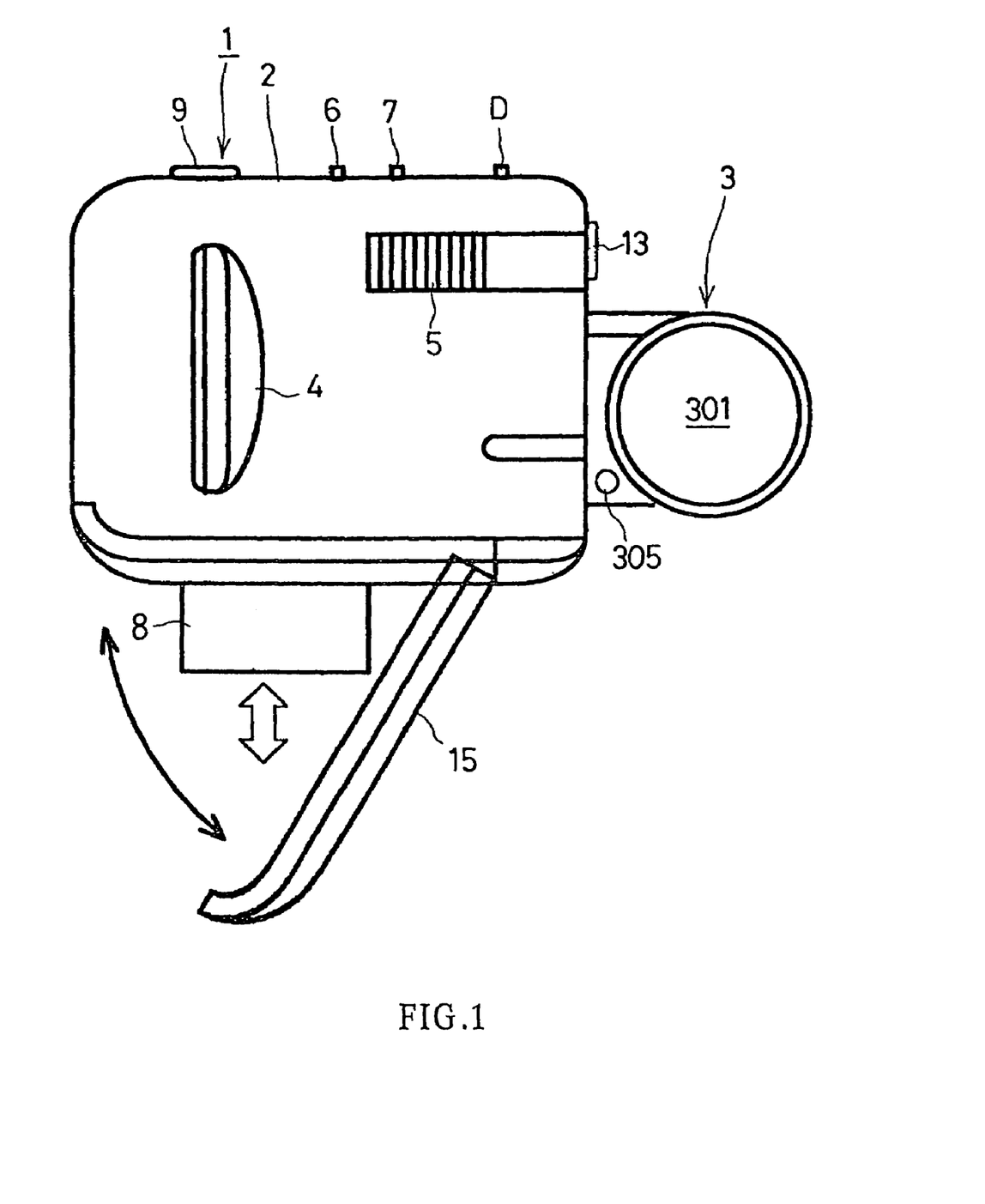
FIG. 1 is a front view of the digital camera according to an embodiment of the present invention.
Figure 2:
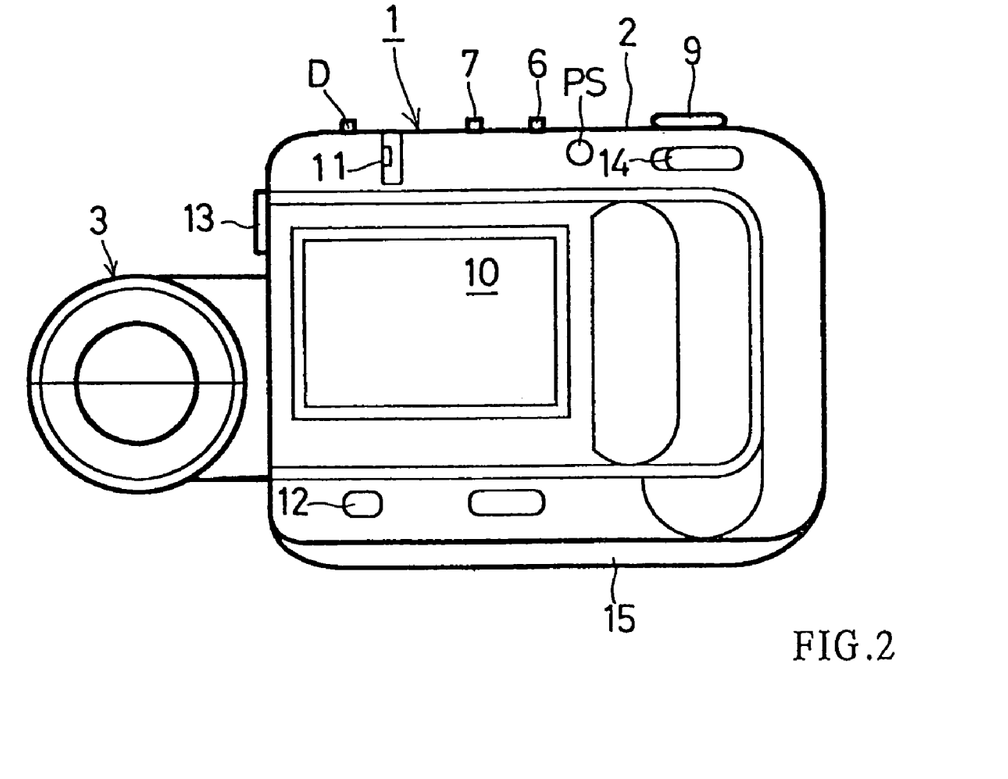
FIG. 2 is a rear view of the digital camera shown in FIG. 1.
Figure 3:
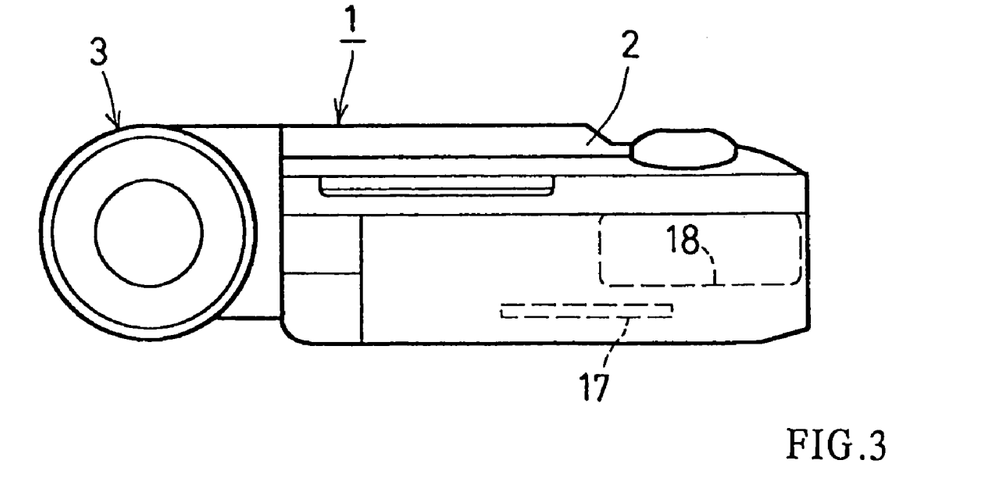
FIG. 3 is a bottom view of the digital camera shown in FIG. 1.

As shown in FIGS. 1–3, a digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has a photographing device comprising a macrozoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera 1 to a personal computer. The image signal taken by the photographing unit 3 is subjected to a prescribed image processing in the main body 2. The processed image is displayed on the LCD display 10, recorded in the memory card 8 or transferred to the personal computer.

A macrozoom lens 301 is provided in the photographing unit 3. An image pick-up circuit including a CCD color area sensor 303 (FIG. 4) is located at an appropriate position behind the macrozoom lens 301. A light-quantity adjusting circuit 304 having a light adjusting sensor 305 for receiving flash light reflected from the object is provided at an appropriate position in the photographing unit 3.

As shown in FIG. 1, a grip 4 is formed in the left-hand side of the front face of the camera main body 2, and a built-in flash lamp 5 is provided in the right-hand upper side at an appropriate position. Frame forwarding and rewinding switches 6 and 7 are provided near the center of the top face of the main body 2 as shown in FIG. 1. The forwarding switch 6 feeds the frame in the direction that the frame number increases in the photographed order, and is referred to as an UP key 6. The rewinding switch 7 feeds the frame in the direction that the frame number decreases, and is referred to as a DOWN key 7. A delete key D for deleting the images recorded in the memory card 8 is provided on the left side of the DOWN key 7, and a shutter release button 9 is provided on the right side of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image.

Provided at the lower side of the LCD 10 is a compression rate setting slide switch 12 for switching the compression rate K of the image date to be recorded in memory card 8. A power switch PS is provided on the top of the rear face of the main body 2. The connection terminal 13 is provided on the side face of the main body 2 near the photographing unit 3.

The flash lamp (which may be abbreviated as FL) of the digital camera 1 has an "automatic flash mode", a "forcible flash mode", and a "flash prohibition mode". In the "automatic flash mode", the built-in flash lamp 5 is automatically flashed according to the luminance of the object. In the "forcible flash mode", the built-in flash lamp 5 is forcibly flashed regardless of the luminance of the object. In the "flash prohibition mode", light emission of the built-in flash lamp 5 is prohibited. Every time the user presses the FL mode setting key 11 positioned above the LCD on the rear face of the main body 2, the flash mode is switched among three modes in a cyclic order. The digital camera 1 has a 1/8 compression rate and a 1/20 compression rate, and the user can select the preferred compression rate K. For example, if the compression rate setting switch 12 is shifted to the right, the compression rate K is set to 1/8, and if it is shifted to the left, the compression rate K is set to 1/20. Although, in this embodiment, the compression rate K is set two modes, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

A battery cavity 18 and a slot 17 for receiving a memory card 8 are positioned on the bottom face of the main body 2. The battery cavity 18 and the slot 17 are covered with a clam-shell type cover 15. The digital camera 1 according to the embodiment has a power supply source E consisting of four AA batteries connected in series.

Figure 4:
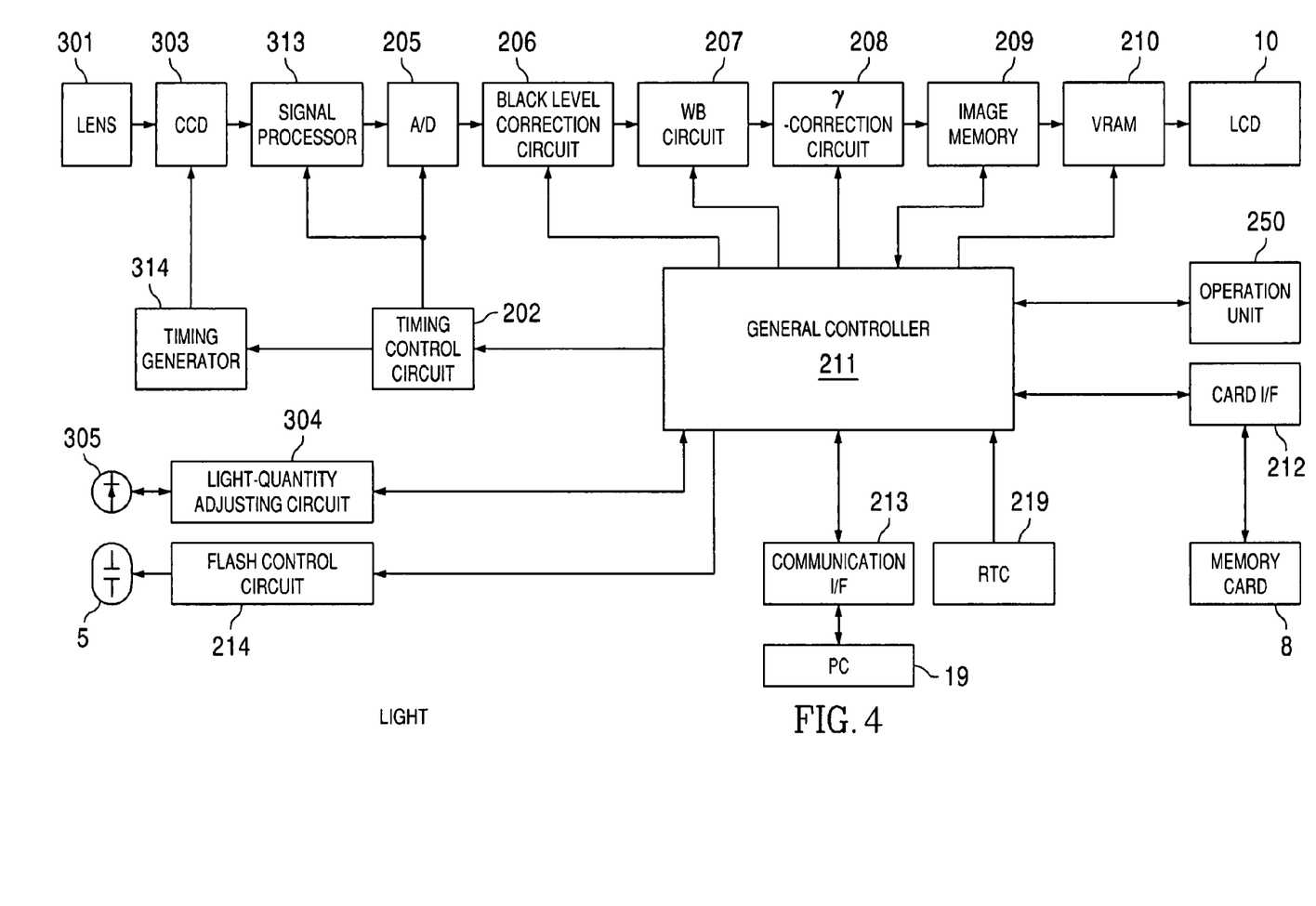
FIG. 4 is a block diagram showing the control system of the digital camera shown in FIGS. 1 through 3.

FIG. 4 is a block diagram of the control system of the digital camera 1.

The CCD 303 in the photographing unit 3 photoelectrically converts the optical image of the object focused by the macrozoon lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313. The diaphragm may be adjustable.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 sets the light emission of the built-in flash lamp 5 to a predetermined level determined by the general controller 211 when the flash lamp is used during the photographing. During the flash photographing, the flash light reflected from the object is received by the light-adjusting sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash lamp 5, whereby the light emission amount of the built-in flash lamp 5 can be regulated to the prescribed level. The light-adjusting sensor 305 is also used as a light-receiving element for controlling the exposure, which measures a brightness of the object in a sequence photograph mode. The light-adjusting sensor 305 detects the difference of the brightness with regard to the brightness at the start of the sequence photograph mode to adjust the exposure of the next shot in the sequence mode in accordance with the difference. In other words, in this digital camera, no light-receiving element for exclusive use is provided.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211. A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The memory capacity of the VRAM 210 corresponds to the number of pixels of the LCD 10.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing the image data into the memory card 8 or reading the image data from the memory card 8. A communication I/F 213 is an interface based on, for example, the USB standard, or an interface for externally connecting the personal computer 19.

A flash control circuit 214 controls light emission of the built-in flash lamp 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 has switches corresponding to the UP key 6, the DOWN key 7, the shutter release button 7, the FL mode setting key 11, the compression rate setting key 12, and the photographing/reproduction mode setting switch 14.

The general controller 211 comprises a micro computer, and it organically controls the driving timing of each element in the photographing unit 3 and the main body 2 so as to generally control the photographing operation of the digital camera 1.

Figure 5:
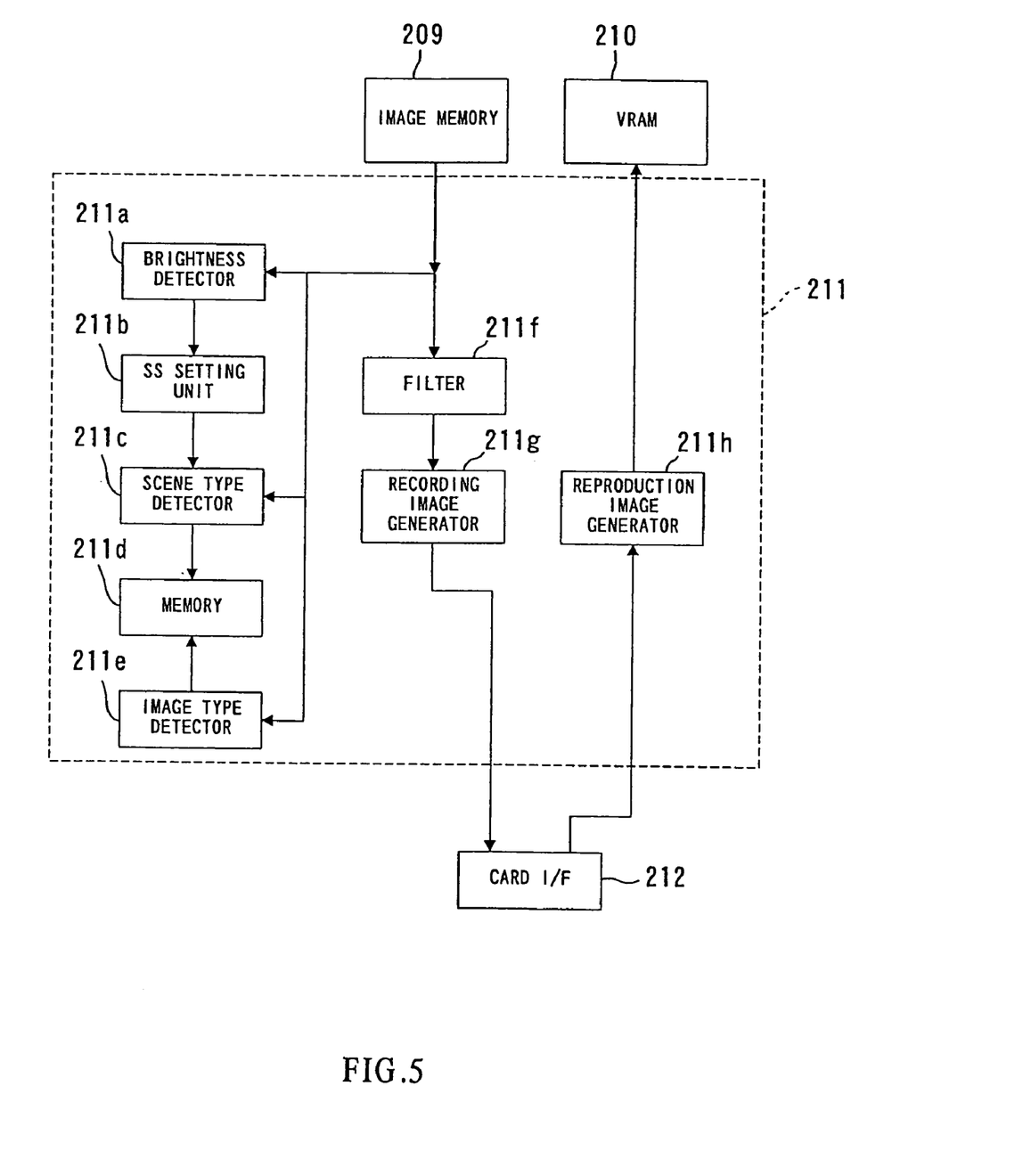
FIG. 5 is a block diagram of the general controller shown in FIG. 4.

As shown in FIG. 5, the general controller 211 has a luminance detector 211a for determining an exposure control value (i.e., a shutter speed SS), and a shutter speed setting unit 211b. In the photographing preparation mode, the luminance detector 211a detects the brightness of the object based on the image taken by the CCD 303 every 1/30 seconds. In other words, the luminance detector 211a determines the brightness of the object from the image data updated and stored in the image memory 209.

The luminance detector 211a divides the memory area of the image memory 209 into nine blocks, and calculates the luminance of each block based on the pixel data representing the G (green) component.

The shutter speed setting unit 211b has a shutter speed table, and determines the shutter speed (that is, the integral time of the CCD 303) based on the brightness of the object detected by the luminance detector 211a.

The shutter speed is initialized to 1/128 seconds at the beginning of the activation of the digital camera 1. During the photographing preparation mode, the shutter speed setting unit 211b varies the shutter speed from the initial value to a higher speed or a lower speed in the stepwise manner, based on the brightness detected by the luminance detector 211a.

The general controller 211 has a scene type detector 211c which determines the current photographing condition from among four types of scenes, "low-luminance scene", "middle-luminance normal scene", "middle-luminance backlight scene", and "high-luminance scene", in order to set the optimum shutter speed, and to appropriately perform the γ correction and filtering correction (which will be described in more detail below). For example, photographing indoor or in the night falls in the "low-luminance scene", which generally requires auxiliary light (i.e., flash light). In the "middle-luminance normal scene", the brightness of light (either natural light or artificial light) is appropriate, and a picture is taken out of the light without auxiliary light. In the "middle-luminance backlight scene", the brightness is appropriate; however, a picture is taken into (or against) light. In this case, flash light is desired. The "high-luminance scene" is on the very bright condition, such as a scene on the beach or a sky slope in a clear day. The determination result of the scene type detector 211c is stored in the memory 211d.

The general controller 211 also has an image type detector 211e which determines if the photographed image is an ordinary photographic image (referred to as a natural image), such as a landscape or a portrait, or a text image, such as characters or charts written on a board.

The image type detector 211e creates a histogram of the luminance of each pixel location based on the pixel data of the photographed image stored in the image memory 209, and then, determines if the photographed image is a natural image or a text image based on the histogram. In general, the histogram of the luminance of the natural image has a gently curved luminance distribution with a single peak value, while the text image has a double-peak luminance distribution with two conspicuous areas in the black and white portions of the image, respectively. Therefore, the image type detector 211e distinguishes between the natural image and the text image by determining if the histogram of the luminance data BV of the photographed image has a single-peak distribution or a double-peak distribution. The determination result is stored in the memory 211d.

In order to record the photographed image, the general controller 211 has a filter 211f for filtering the image data, and a recording image generator 211g for generating a thumb nail image and a compressed image. A reproduction image generator 211h reproduces the image recorded in the memory card 8, and generates a reproduction image which is to be display on the LCD 10. The recording image generator 211g compresses the image data when the compression mode is selected by manipulating the compression rate setting slide switch 12. The reproduction image generator 211h expands the compressed image to display.

The filter 211f consists of five digital filters to correct for the high frequency component of the image data at each compression rate 1/8 or 1/20, thereby correcting the contour of the image to be recorded. Five filters includes a digital filter for performing a standard contour correction, two digital filters for enhancing the contour of the image which was already subjected to the standard contour correction, and two digital filters for weakening the contour of the image after the standard contour correction.

The recording image generator 211g reads the pixel data out of the image memory 209, and generates a thumb nail image and a compressed image which are to be recorded in the memory card 8. To be more precise, the recording image generator 211g scans the image memory 209 in the raster direction, and reads out every 8 pixels in both the horizontal and vertical directions to create a thumb nail image. The 8×8 pixel data (or the thumb nail images) are successively transferred to and recorded in the memory card 8.

The recording image generator 211g also reads out the entire pixel data from the image memory 209, and applies a prescribed data compression based on a JPEG method, such as two-dimensional DCT conversion or Hoffmann encoding, to create a compressed image data. The compressed image data is recorded in the primary image area of the memory card 8.

If in the photographing mode the shutter button 9 is pressed to start photographing, the general controller 211 creates a thumb nail image created from the image taken in the image memory 209 after the start of the photographing operation, and the compressed image created by a JPEG method when the compression mode is selected by manipulating the compression rate setting slide switch 12. A tag information (such as the frame number, exposure value, shutter speed, compression rate K, photographing date and time, flash ON/OFF data, scene information, image type, judged result of the image, etc) stored in the memory card 8, the compressed image and the thumb nail image are stored in the memory card 8.

Figure 6:
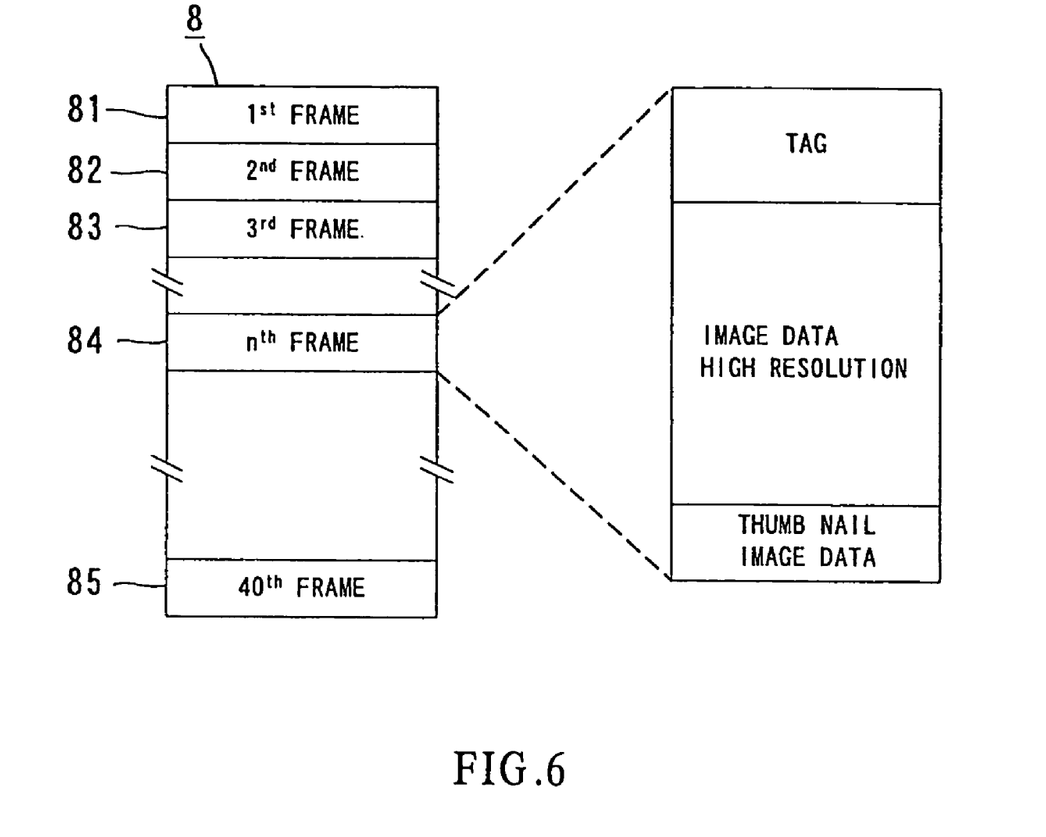
FIG. 6 illustrates the data-storage structure of the memory card.

As shown in FIG. 6, the memory card 8 can store forty frames of images taken by the digital camera 1 at a 1/20 compression rate. Each of the frames 81–85 has tag information, high-resolution image data (640×480 pixels) compressed by a JPEG method, and thumb nail image data (80×60 pixels). Each frame may be an image file of EXIF type.

<Exposure Control Operations>

Figure 7:
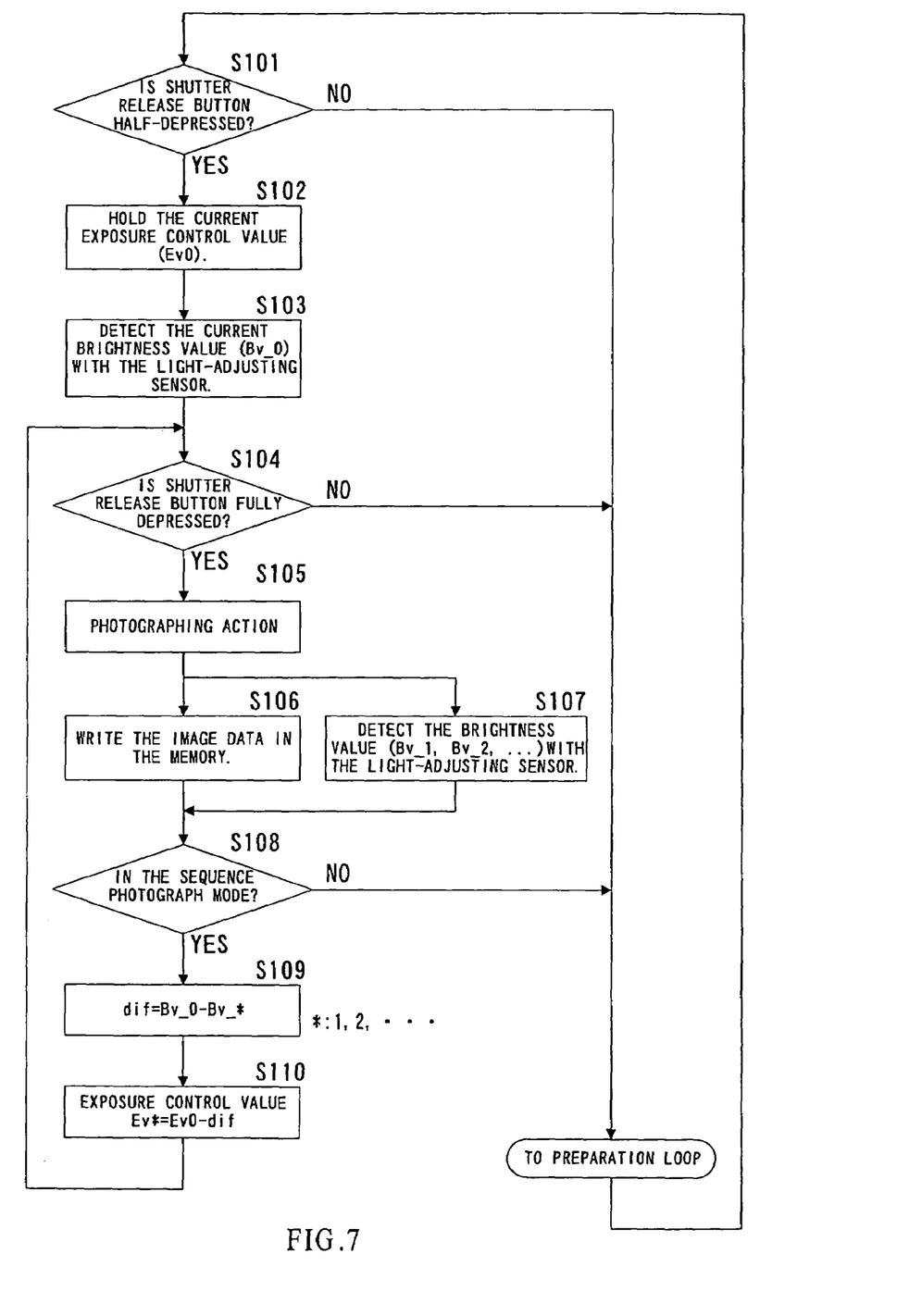
FIG. 7 is a flowchart of the exposure control operations for the digital camera.

FIG. 7 is a flowchart showing the exposure control operations for the digital camera 1. In FIG. 7, Bv (brightness value) denotes the brightness index of the object, Ev (exposure value) denotes the exposure index (the exposure control value) which is defined by the combination of the diaphragm value and the shutter speed, and "dif" denotes a change in the brightness of the object.

If the shutter release button 9 is depressed in the preparation state, it is determined in S101 if the shutter release button 9 has been half-depressed. In the half-depressed state (YES in S101), the current exposure control value is held (S102), and the light-adjusting sensor 305 detects the current brightness of the object (S103). The exposure control value held in step S102 is the value obtained by the shutter speed setting unit 211b based on the image data generated by the CCD 303. If the shutter release button 9 is not in the half-depressed state (NO in S101), the process returns to the preparation loop.

After the current brightness of the object is detected in S103, it is determined in S104 if the shutter release button 9 has been fully depressed. If the shutter release button 9 was fully depressed (YES in S104), a photographing action is started (S105). If the digital camera is not in the sequence photograph mode, or if the next shot is the first one in the sequence photograph mode, then a photographing action is taken based on the exposure control value obtained in S102. In this case, the image data obtained from this photographing action is recorded in the image memory 209 in S106, while the brightness of the object in this photographing action is measured by the light-adjusting sensor 305 in S107. If the shutter release button 9 is not fully depressed (NO in S104), the process returns to the preparation loop.

In this photographing state, it is determined in S108 if the sequence photograph mode was selected. If it is determined that the sequence photograph mode has been selected (YES in S108), the change or the difference "dif" in the brightness of the object as compared with the previous shot is detected in S109. In S110, the exposure control value for the next shot (or the next frame) in the sequence photograph mode is changed taking the brightness difference "dif" into account. Then, the process returns to S104, and the operations on and after S104 are repeated. If the next shot is not in the sequence photograph mode (NO in S108), the process returns to the preparation loop.

In this manner, the optimum exposure control value can be generated promptly so as to correspond to the change in the brightness of the object, without causing a time lag, even in the high-speed sequence-photograph mode. This is achieved because the conventional arithmetic loop for calculating an exposure value from the image data is prevented, and instead, the current brightness of the object detected by the light-adjusting sensor 305 is used to compute the exposure control value for the next shot during the sequence photograph mode. Thus, the image quality can be maintained high even in the sequence photograph mode. In addition, since the light-adjusting sensor 305 is used to detect a change in the brightness of the object, it is not necessary to provide an extra light-receiving element for exclusive use in exposure control. Therefore, the manufacturing cost can be prevented from being increased.

In the above-described embodiment, changes in the brightness of the object are detected by the light-adjusting sensor. However, if an AF (automatic focussing) sensor is provided in the digital camera, the AF sensor may be used to detect changes in the brightness of the object.

As it has been explained, the exposure amount of the image pick-up element is correctly controlled during the execution of the sequence photograph mode, based on the output from the light-receiving element. Therefore, a high-speed sequence photographing operation can be realized, while the image quality is maintained, unlike the conventional digital camera which executes an arithmetic loop for calculating the exposure control value for each shot based on the image data obtained from the image pick-up element.

The light-receiving element, which is used to provide the brightness information to compute the appropriate exposure control value in the sequence photograph mode, is also used to control other parameters in the other modes of the digital camera. Therefore, it is not necessary to provide an extra light-receiving element for exclusive use in an exposure control.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A digital camera having a sequence-photograph mode and other modes, said digital camera comprising:
   an image pick-up element for receiving light reflected from an object and outputting image data of the object;
   a light-receiving element for outputting data as to a light quantity received from the object, said light-receiving element being different from said image pick-up element;
   a first controller for controlling an exposure amount of said image pick-up element for a next frame in a sequence of photographs directly based on the light-quantity data for a previous frame output from said light-receiving element in the sequence-photograph mode; and
   a second controller for controlling the exposure amount of said image pick-up element based on the image data output from said image pick-up element in the other modes,
   wherein the light-receiving element outputs the light-quantity data during each frame in the sequence-photograph mode.

2. The digital camera according to claim 1, wherein said image pick-up element is a CCD.

3. The digital camera according to claim 2, wherein said second controller controls a charge accumulation time of said CCD based on the image data output from said image pick-up element to control the exposure amount.

4. The digital camera according to claim 3, further comprising a third controller for controlling parameters other than the charge accumulation time of said CCD, based on the light-quantity data output from said light-receiving element, in the other modes.

5. The digital camera according to claim 4, further comprising a flash lamp, wherein said third controller controls a quantity of light emission of said flash lamp.

6. A method for controlling an exposure amount of a digital camera which has a sequence-photograph mode and other modes, the method comprising the steps of:
   receiving light reflected from an object and generating image data of the object using an image pick-up element;
   receiving light from the object and generating light-quantity data of the object using a light-receiving element which differs from the image pick-up element;
   controlling an exposure amount of the image pick-up element for a next frame in a sequence of photographs directly based on the light-quantity data for a previous frame generated by the light-receiving element if the digital camera is in the sequence-photograph mode; and
   controlling an exposure amount of the image pick-up element based on the image data generated by the image pick-up element if the digital camera is in the other modes,
   wherein the light-receiving element outputs the light-quantity data during each frame in the sequence-photograph mode.

7. The method according to claim 6, wherein the image pick-up element is a CCD.

8. The method according to claim 7, wherein a charge accumulation time of the CCD is controlled based on the image data output from the image pick-up element in the other modes to control the exposure amount.

9. The method according to claim 8, further comprising a step of:
   controlling a parameter other than the charge accumulation time of the CCD controlled in accordance with the light-quantity data output from the light-receiving element in the other modes.

10. The method according to claim 9, wherein the digital camera has a flash lamp, and wherein the parameter other than the charge accumulation time of the CCD, which is controlled in accordance with the light-quantity data output by the light-receiving element, is a quantity of light emission of the flash lamp.

11. A digital camera having a sequence-photograph mode and other modes, said digital camera comprising:
    an image pick-up element for receiving light reflected from an object and outputting image data of the object;
    a light-receiving element for outputting data as to a light quantity received from the object, said light-receiving element being different from said image pick-up element; and
    a controller, for controlling an exposure amount of said image pick-up element for a next frame in a sequence of photographs directly based on the light-quantity data for a previous frame output from said light-receiving element in the sequence-photograph mode, and for controlling the exposure amount of said image pick-up element based on the image data output from said image pick-up element in the other modes,
    wherein the light-receiving element outputs the light-quantity data during each frame in the sequence-photograph mode.

12. A digital camera according to claim 11, wherein said image pick-up element is a CCD.

13. A digital camera according to claim 12, wherein said controller controls a charge accumulation time of said CCD based on the image data output from said image pick-up element to control the exposure amount.

14. A digital camera according to claim 13, wherein said controller controls parameters other than the charge accumulation time of said CCD, based on the light-quantity data output from said light-receiving element, in the other modes.

15. A digital camera according to claim 14, further comprising a flash lamp, wherein said controller controls a quantity of light emission of said flash lamp.

* * * * *